United States Patent
Song

(10) Patent No.: US 9,686,384 B2
(45) Date of Patent: Jun. 20, 2017

(54) ELECTRONIC DEVICE WITH ROTATING INPUT UNIT AND METHOD FOR OPERATING THE SAME

(71) Applicant: Sukjun Song, Freshmeadows, NY (US)

(72) Inventor: Sukjun Song, Freshmeadows, NY (US)

( * ) Notice: Subject to any disclaimer, the term of this patent is extended or adjusted under 35 U.S.C. 154(b) by 0 days.

(21) Appl. No.: 14/715,613

(22) Filed: May 19, 2015

(65) Prior Publication Data

US 2016/0165023 A1  Jun. 9, 2016

Related U.S. Application Data

(60) Provisional application No. 62/089,829, filed on Dec. 9, 2014.

(51) Int. Cl.
*H04M 1/00* (2006.01)
*H04M 1/02* (2006.01)
*H04M 1/23* (2006.01)

(52) U.S. Cl.
CPC ....... *H04M 1/0208* (2013.01); *H04M 1/0243* (2013.01); *H04M 1/0264* (2013.01); *H04M 1/0231* (2013.01); *H04M 1/23* (2013.01); *H04M 2250/16* (2013.01); *H04M 2250/20* (2013.01)

(58) Field of Classification Search
CPC  H04M 1/0208; H04M 2250/16; H04W 12/10
USPC ... 455/566, 556.1, 574, 575.3, 550.1, 575.1; 370/328, 312, 390, 352; 345/545, 174, 345/690, 156
See application file for complete search history.

(56) References Cited

U.S. PATENT DOCUMENTS

| | | | |
|---|---|---|---|
| 8,626,247 B2* | 1/2014 | Yoon | G06F 1/1622 345/212 |
| 9,223,396 B2* | 12/2015 | Ichikawa | G06F 3/005 |
| 2003/0052857 A1* | 3/2003 | Pappas | G06F 1/1601 345/156 |
| 2004/0204059 A1* | 10/2004 | Wong | H04M 1/0212 455/556.1 |
| 2004/0244146 A1* | 12/2004 | Park | G06F 1/1616 16/239 |
| 2005/0038982 A1* | 2/2005 | Park | G06F 1/162 713/1 |
| 2005/0063149 A1* | 3/2005 | Shimamoto | G06F 1/162 361/679.06 |
| 2006/0135226 A1* | 6/2006 | Won | G06F 1/1616 455/575.3 |
| 2007/0123325 A1* | 5/2007 | Kim | H04M 1/0245 455/575.3 |
| 2007/0298850 A1* | 12/2007 | Miyata | H04M 1/021 455/575.3 |
| 2009/0131117 A1* | 5/2009 | Choi | G06F 1/1616 455/566 |
| 2009/0298548 A1* | 12/2009 | Kim | H04M 1/72544 455/566 |

(Continued)

*Primary Examiner* — Joseph Arevalo
(74) *Attorney, Agent, or Firm* — Antonio Ha & U.S. Patent, LLC

(57) ABSTRACT

According to an embodiment of the present invention, an electronic device includes a first body having a first display on a first surface of the first body and a second body having a second display on a first surface of the second body and an input unit on a second surface of the second body. The first body and the second body are rotatably coupled with each other.

16 Claims, 19 Drawing Sheets

(56) References Cited

U.S. PATENT DOCUMENTS

| | | | | |
|---|---|---|---|---|
| 2010/0079355 | A1* | 4/2010 | Kilpatrick, II | G06F 1/1616 345/1.3 |
| 2010/0190537 | A1* | 7/2010 | Fujii | H01Q 1/2216 455/575.4 |
| 2010/0298032 | A1* | 11/2010 | Lee | G06F 1/1616 455/566 |
| 2011/0115737 | A1* | 5/2011 | Fuyuno | G06F 1/1616 345/173 |
| 2011/0138278 | A1* | 6/2011 | Miyata | G06F 1/1616 715/702 |
| 2011/0164163 | A1* | 7/2011 | Bilbrey | G06F 1/1694 348/333.01 |
| 2012/0026069 | A1* | 2/2012 | Ohsaki | G06F 1/1616 345/1.2 |
| 2012/0162238 | A1* | 6/2012 | Fleck | G09G 3/20 345/545 |
| 2012/0162270 | A1* | 6/2012 | Fleck | G09G 3/3413 345/690 |
| 2012/0163021 | A1* | 6/2012 | Bohn | G02F 1/133615 362/608 |
| 2012/0274541 | A1* | 11/2012 | Inami | G09G 5/00 345/1.3 |
| 2013/0050557 | A1* | 2/2013 | Moriyasu | H04N 5/2251 348/333.06 |
| 2013/0083240 | A1* | 4/2013 | Kerr | G06F 3/1446 348/383 |
| 2013/0155307 | A1* | 6/2013 | Bilbrey | G06F 1/1694 348/333.01 |
| 2014/0043259 | A1* | 2/2014 | Park | G06F 3/0412 345/173 |
| 2014/0101575 | A1* | 4/2014 | Kwak | G06F 1/1616 715/761 |
| 2014/0115505 | A1* | 4/2014 | Yoon | G06F 1/1622 715/761 |
| 2014/0157125 | A1* | 6/2014 | Seo | G06F 3/165 715/716 |
| 2014/0164976 | A1* | 6/2014 | Kim | G06F 1/1643 715/773 |
| 2015/0268916 | A1* | 9/2015 | Eisenberg | G06F 3/1431 455/566 |
| 2016/0026381 | A1* | 1/2016 | Kim | G06F 3/04817 715/761 |

* cited by examiner

ELECTRONIC DEVICE WITH ROTATING INPUT UNIT AND METHOD FOR OPERATING THE SAME

CROSS-REFERENCE TO RELATED APPLICATION

This non-provisional application claims priority under 35 U.S.C. 119 to the U.S. Provisional Application No. 62/089,829 filed on Dec. 9, 2014, the disclosure of which is incorporated by reference herein in its entirety.

TECHNICAL FIELD

Embodiments of the present invention concern electronic devices, and more specifically, to an electronic device with a rotating input unit and a method for operating the same.

DISCUSSION OF RELATED ART

As mobile communication services evolve to next generations (e.g., 4G), use of smartphones is widely spreading. Smartphones offer users various life conveniences.

A smartphone is equipped with an operating system (OS) and allows for execution of diverse applications or software programs. A smartphone comes with various types of input means, including a physical keyboard or keypad and a virtual keyboard that may be displayed on the screen for the user's key entry.

SUMMARY

According to an embodiment of the present invention, an electronic device includes a first body having a first display on a first surface of the first body and a second body having a second display on a first surface of the second body and an input unit on a second surface of the second body. The first body and the second body are rotatably coupled with each other.

The first display and the second display seamlessly may abut each other to configure a whole display screen.

The input unit of the second body may include at least one physical key.

The at least one physical key may correspond to at least one key value respectively corresponding to at least one character, letter, or symbol.

The electronic device may further include a controller configured to, when an input is performed through at least two of the keys, enable a predetermined value corresponding to a combination of the at least two keys to be input.

A first camera may be provided in a second surface of the first body. When the second body is rotated with respect to the first body to allow the first camera to be disposed on the same surface as the second display of the second body, an image input through the first camera may be displayed on the second display.

At least one function of the first camera may be controlled through the input unit.

The electronic device may include a battery supplying power to the electronic device, the battery recharged by electric power generated as the second body is rotated.

The electronic device may include a rotation sensor sensing an angle of rotation of the second body. At least one operation of an application executed on the electronic device may be controlled based on the sensed angle of rotation.

According to an embodiment of the present invention, there is provided a method for operating an electronic device includes sensing a rotation of at least one of a first body and a second body included in the electronic device. The first body and the second body rotatably are coupled with each other. The first body has a first display on a first surface thereof, and the second body has a second display on a first surface thereof and an input unit on a second surface thereof, which is opposite to the first surface of the second body.

The method determining whether the input unit is disposed on the same surface as the first display and enabling the input unit depending on the determination.

The first display and the second display may seamlessly abut each other to configure a whole display screen.

The input unit of the second body may include at least one physical key.

The at least one physical key may correspond to at least one key value respectively corresponding to at least one character, letter, or symbol.

The method may further include, when an input is performed through at least two of the keys, enabling a predetermined value corresponding to a combination of the at least two keys to be input.

The method may further include enabling a first camera provided in a second surface of the first body, sensing a rotation of the second body to determine whether the first camera is disposed on the same surface as the second display, and displaying an image input through the first camera on the second display depending on the determination.

The method may further include controlling at least one function of the first camera through the input unit.

The method may further include generating electric power as the second body rotates and recharging a battery of the electronic device with the generated electric power.

The method may further include sensing an angle of rotation of the second body and controlling at least one operation of an application executed on the electronic device based on the sensed angle of rotation.

The method may further include displaying an image received from a first terminal on the first display and the second display as a video call is executed, receiving a video call request from a second terminal, sensing a rotation of the second body to accept the video call request, and displaying an image received from the second terminal on the second display.

The method may further include sensing the rotation of the second body to determine whether the first display and the second display are disposed on the same surface and performing a multi-party video call with the first terminal and the second terminal.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the inventive concept will be described in detail with reference to the accompanying drawings. The inventive concept, however, may be modified in various different ways, and should not be construed as limited to the embodiments set forth herein. It will be understood that when an element or layer is referred to as being "on," "connected to," "coupled to," or "adjacent to" another element or layer, it can be directly on, connected, coupled, or adjacent to the other element or layer, or intervening elements or layers may be present. As used herein, the singular forms "a," "an," and "the" are intended to include the plural forms as well, unless the context clearly indicates otherwise. The same reference denotations may be used to refer to the same or substantially the same elements throughout the specification and the drawings.

As used herein, the term "electronic device" includes, but not is limited to, a smartphone, a tablet personal computer (PC), a mobile phone, a video phone, an electronic-book (e-book) reader, a desktop personal computer (PC), a laptop PC, a netbook computer, a workstation, a server, a personal digital assistant, a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smartwatch).

Figure 1:
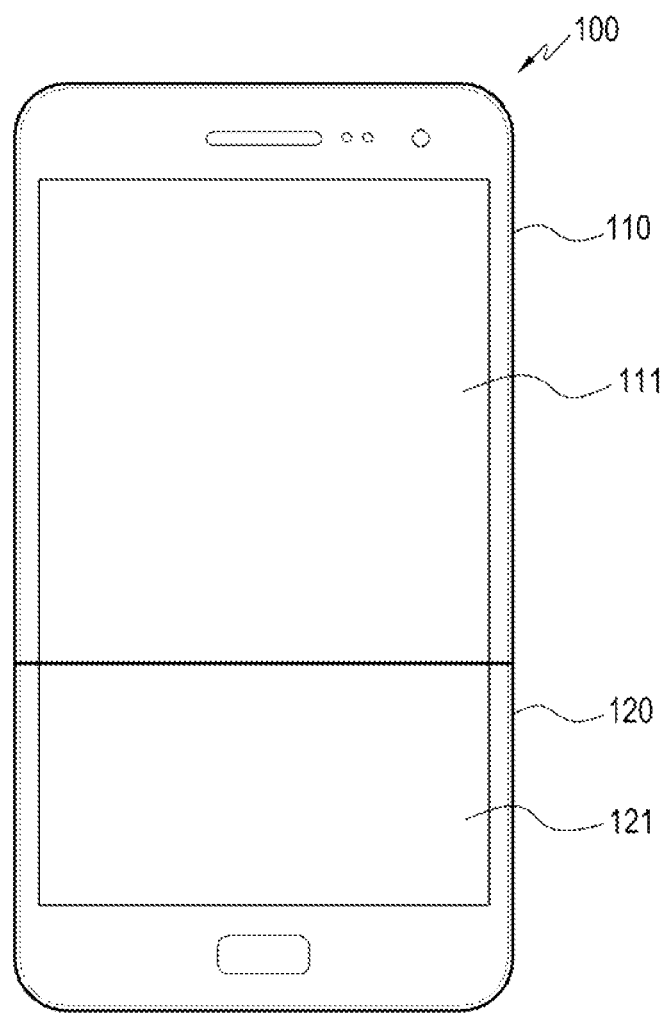
FIG. 1 is a front view illustrating an electronic device according to an embodiment of the present invention.

FIG. 1 is a front view illustrating an electronic device according to an embodiment of the present invention.

Referring to FIG. 1, the electronic device 100 includes an upper body 110 and a lower body 120. The upper body 110 and the lower body 120 may be adjacently coupled with each other. The upper body 110 may have a first display 111 on a front surface, and the lower body 120 may have a second display 121 on a front surface.

The first display 111 of the upper body 110 may abut the second display 121 of the lower body 120 so that there is no gap or space between the first display 111 and the second display 121, thus preventing the border between the first display 111 and the second display 121 from being noticeable when an image is displayed on the first display 111 and the second display 121.

At least one of the first display 111 and the second display 121 may be implemented as a touchscreen. A virtual keyboard may be displayed on the second display 121 for key entry.

According to an embodiment of the present invention, the first display 111 and the second display 121 may display separate images, respectively, or the first display 111 and the second display 121 may together display an image. When multiple applications are executed on the electronic device 100, the multiple applications may be displayed on the first display 111 and the second display 121, respectively.

Figure 2:
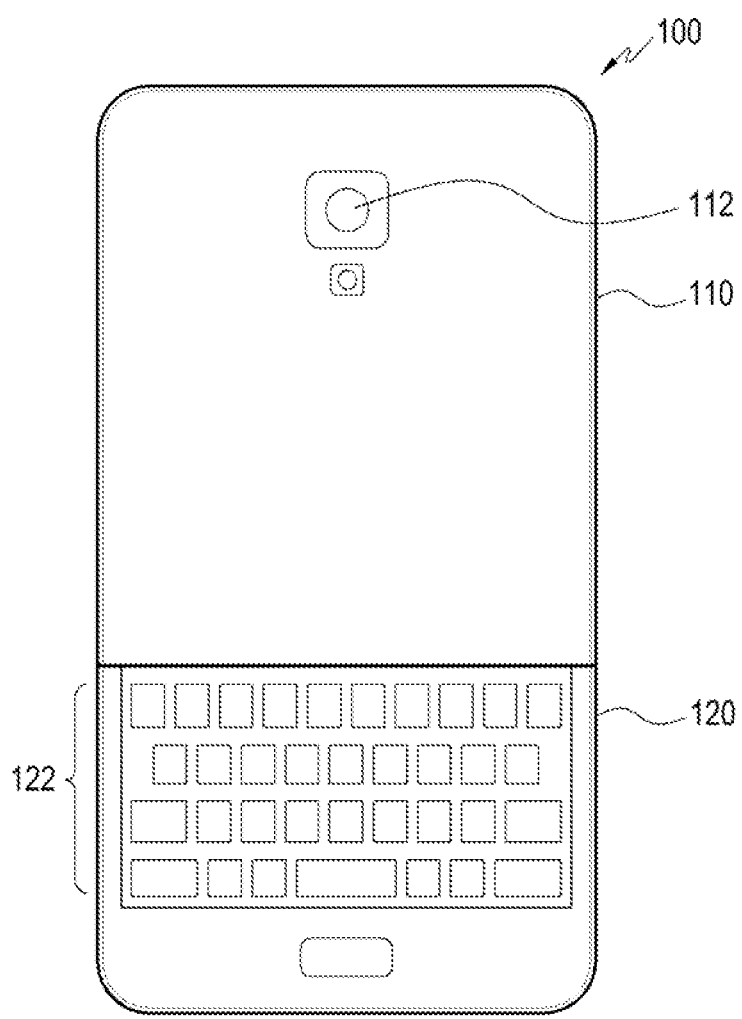
FIG. 2 is a rear view illustrating an electronic device according to an embodiment of the present invention.

FIG. 2 is a rear view illustrating an electronic device according to an embodiment of the present invention.

Referring to FIG. 2, the electronic device 100 includes the upper body 110 and the lower body 120. The upper body 110 may have a camera on a rear surface thereof, and the lower body 120 may have at least one input unit 122 on a rear surface thereof.

The electronic device 100 may include a plurality of cameras (e.g., a front camera and a rear camera). The camera 112 provided on the rear surface of the upper body 110 may have a higher resolution than a resolution of the front camera provided on the front surface of the electronic device 100.

The input unit 122 provided on the rear surface of the lower body 120 may include a keyboard or a keypad with a plurality of keys. The input unit 122 may have various numbers and arrangements of keys. For example, the input unit 122 may include keys for entry of characters, numbers, or symbols.

The input unit 122 may be configured in various types of input means. For example, the input unit 122 may include a physical keypad or keyboard, a touchpad, or a software keyboard or keypad, but not limited thereto.

According to an embodiment of the present invention, the input unit 122 may be activated or deactivated depending on predetermined conditions. For example, the electronic device 100 may be set so that when the electronic device 100 is in a full screen mode as shown in FIG. 1 the input unit 122 on the rear surface of the electronic device 100 may be in a disabled state or so that when the lower body 120 of the electronic device 100 swivels to the position shown in FIG. 5, the input unit 122 may turn into an activated mode. The position shown in FIG. 5, in which the first display 111 and the input unit 122 are arranged on the front surface of the electronic device 100 may be herein referred to an a partial screen mode.

Figure 3:
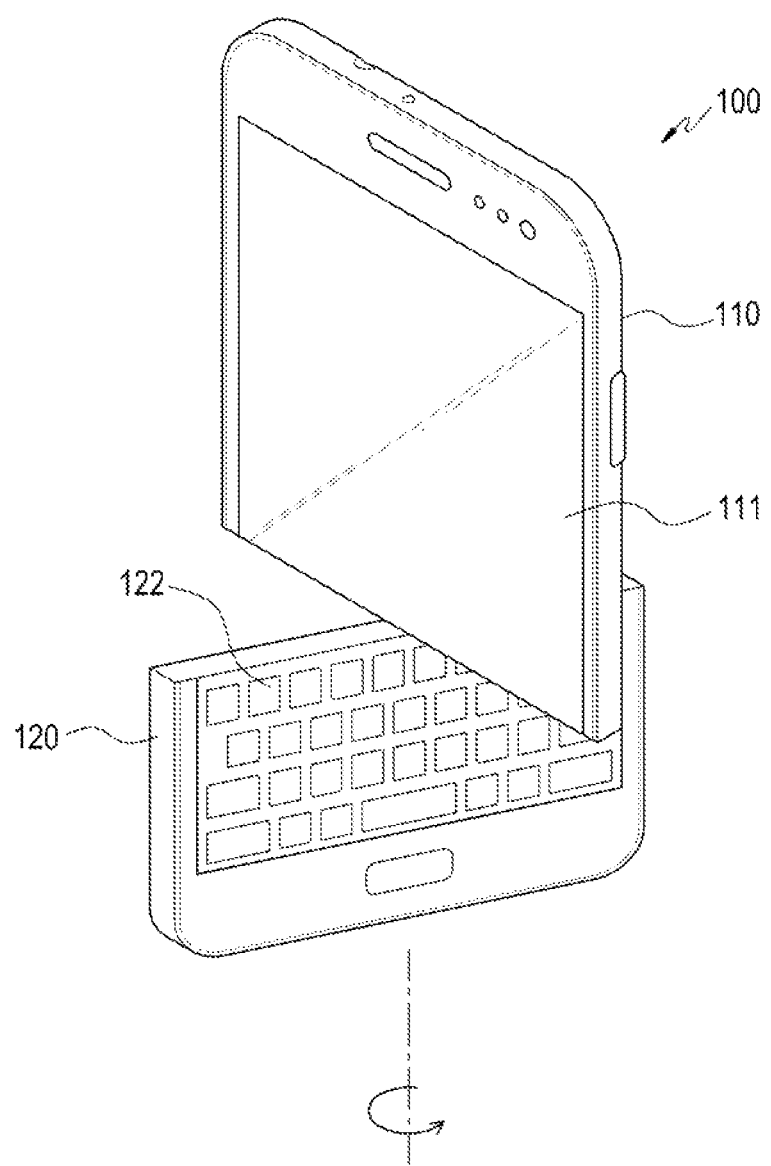
FIGS. 3 and 4 are perspective views illustrating a swivel operation of an electronic device according to an embodiment of the present invention.
Figure 4:
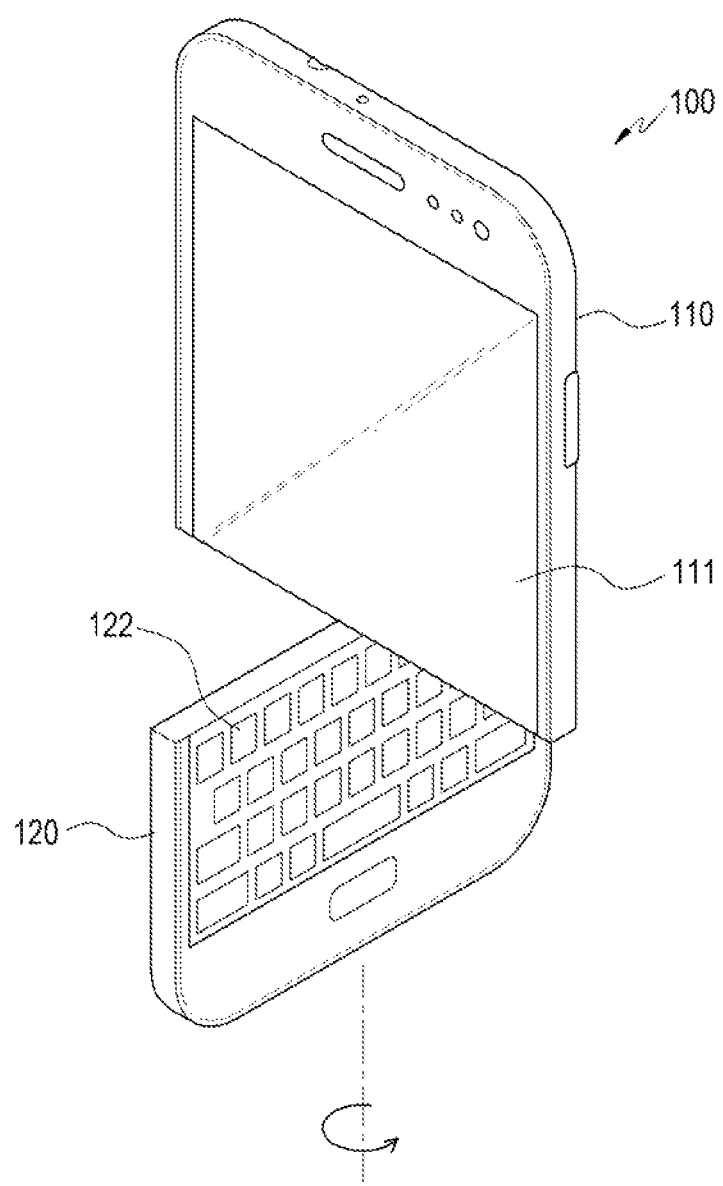

FIGS. 3 and 4 are perspective views illustrating a swivel operation of an electronic device according to an embodiment of the present invention. Referring to FIGS. 3 and 4, the upper body 110 and the lower body 120 of the electronic device 100 may be coupled with each other to be twisted or rotated with respect to each other. For example, the upper body 110 and the lower body 120 may be rotated against each other with respect to a longitudinal axis as shown in FIGS. 3 and 4.

When the lower body 120 is rotated about the upper body 110, a controller of the electronic device 100 may sense such swivel and an angle at which the lower body 120 is rotated. According to an embodiment of the present invention, upon sensing a swivel of the lower body 120, the controller of the electronic device 100 may control a predetermined operation of the electronic device 100 or may provide a key entry.

Figure 5:
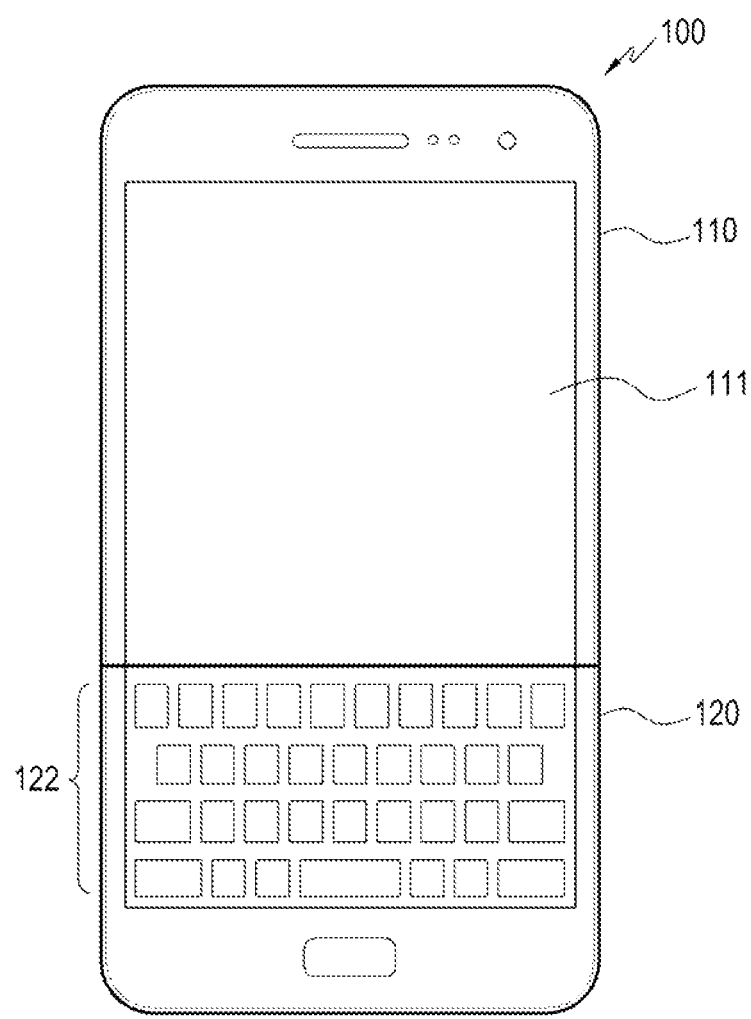
FIGS. 5 and 6, respectively, are a front view and a rear view illustrating an electronic device, with a lower body of the electronic device staying in a rotated position, according to an embodiment of the present invention.
Figure 6:
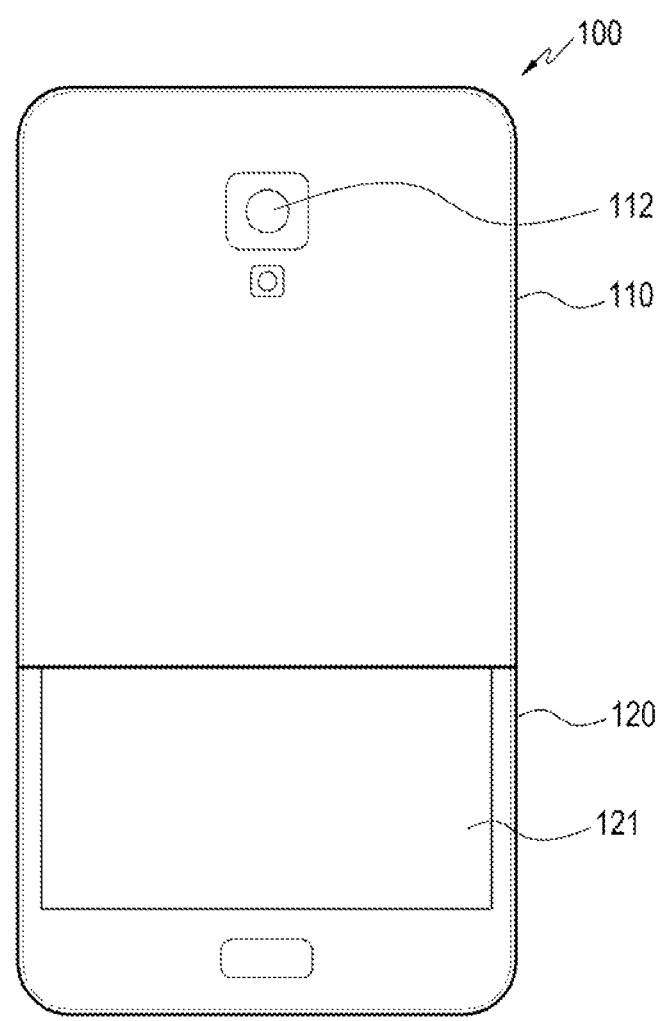

FIGS. 5 and 6, respectively, are a front view and a rear view illustrating an electronic device, with a lower body of the electronic device staying in a rotated position, according to an embodiment of the present invention.

Referring to FIG. 5, when the lower body 120 of the electronic device 100 in the position shown in FIG. 1 is rotated at 180 degrees with respect to the upper body 110, the input unit 122 is positioned in a lower part on the front surface of the electronic device 100. In the rotated position, for example, the first display 111 is disposed in an upper part on the front surface of the electronic device 100, and the input unit 122 is disposed in a lower part on the front surface of the electronic device 100.

According to an embodiment of the present invention, the input unit 122 may be configured to be enabled or activated when the lower body 120 is rotated to the position shown in FIG. 5. When the input unit 122 is activated, the input unit 122 may be used as an input means to the first display 111.

Referring to FIG. 6, when the lower body 120 of the electronic device 100 in the position shown in FIG. 1 is rotated at 180 degrees with respect to the upper body 110, the second display 121 is positioned in a lower part on the rear surface of the electronic device 100. In the rotated position, for example, the second display 121 is disposed in a lower part on the rear surface of the electronic device 100, and the camera 112 is disposed in an upper part on the rear surface of the electronic device 100. In the position shown in FIG. 6, the second display 121 may be used in various forms as will be described below in connection with FIG. 10 or 14.

Figure 7:
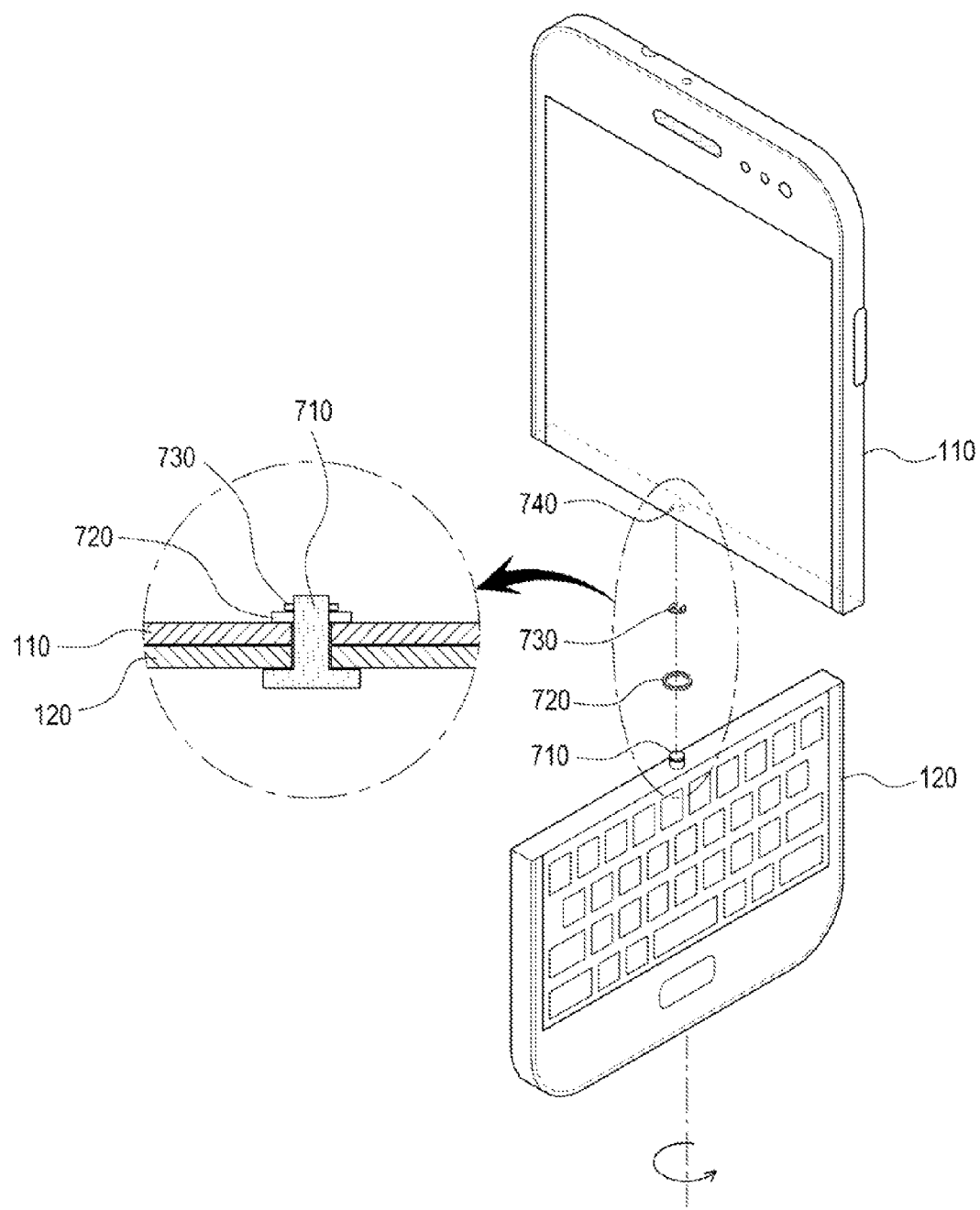
FIG. 7 is an exploded perspective view illustrating a connecting structure between an upper body and a lower body of an electronic device according to an embodiment of the present invention.

FIG. 7 is an exploded perspective view illustrating a connecting structure between an upper body and a lower body of an electronic device according to an embodiment of the present invention.

Referring to FIG. 7, the upper body 110 and the lower body 120 of the electronic device 100 may be coupled with each other to be rotated with respect to each other.

For example, a connecting protrusion 710 formed in an upper part of the lower body 120 may be inserted into the upper body 110 through a connecting hole 740 formed in a lower part of the upper body 110, and a washer 720 and an E-ring 730 may be sequentially put on the connecting protrusion 710 to prevent the upper body 110 and the lower body 120 from being escaped or released from each other when the lower body 120 is rotated.

The connecting structure shown in FIG. 7 is merely an example of a means to rotatably couple the upper body 110 and the lower body 120, and such rotatable connection between the upper body 110 and the lower body 120 may be implemented by other various structures, without limited thereto.

According to an embodiment of the present invention, the upper body 110 and the lower body 120 may be electrically connected with each other. For example, a signal input through the input unit 122 of the lower body 120 may be processed by the controller of the electronic device 100, and the processed signal may be displayed on the first display 111 of the upper body 110.

According to an embodiment of the present invention, the electronic device 100 may include a separate rotation sensor. The rotation sensor may sense a rotation of the lower body 120 with respect to the upper body 110. According to an embodiment of the present invention, the rotation sensor may sense not only the rotation of the lower body 120, but also a direction or angle of the rotation.

Information including the rotation, direction or angle of the rotation sensed by the rotation sensor may apply to a switch between operation modes of the electronic device 100 or an operation of an application being executed on the electronic device 100.

According to an embodiment of the present invention, the electronic device 100 may further include a power generator that may generate electric power as the lower body 120 rotates. For example, a battery of the electronic device 100 may be recharged with electric power generated by the power generator as the upper body 110 and the lower body 120 rotate.

Figure 8:
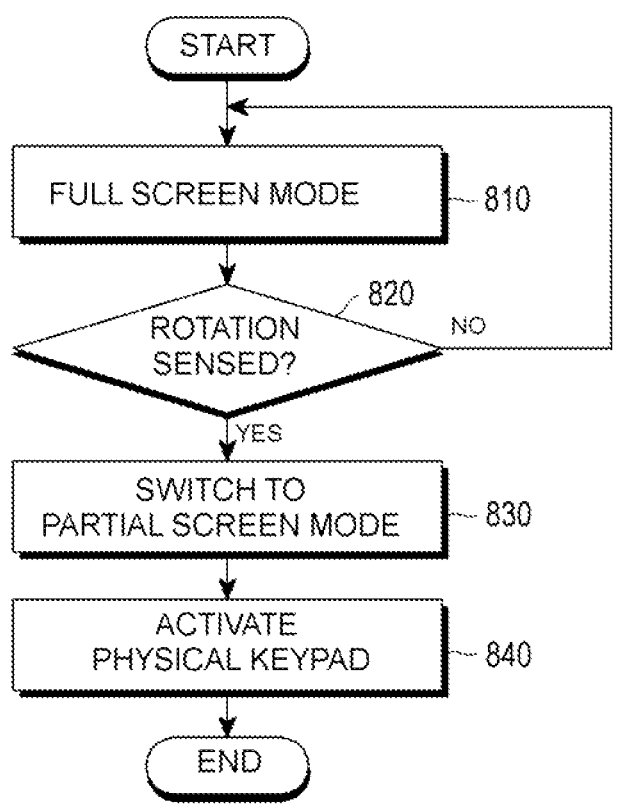
FIG. 8 is a flowchart illustrating an operation of an electronic device according to an embodiment of the present invention.

FIG. 8 is a flowchart illustrating an operation of an electronic device according to an embodiment of the present invention.

Referring to FIG. 8, the electronic device 100 may operate in a front, full screen mode where the first display 111 and the second display 121 are used as a whole screen as shown in FIG. 1 (step 810). Upon sensing a rotation of the lower body 120, the electronic device 100 may switch to a partial screen mode as shown in FIG. 5 (step 830). When the electronic device 100 switches to the partial screen mode, the input unit 122 (e.g., a physical keypad) may be activated to allow for key entry (step 840).

According to an embodiment of the present invention, at least one of the steps shown in FIG. 8 may be omitted, and at least one more step may be added. Alternatively, at least one step may be performed in a different order from another of the steps.

Figure 9:
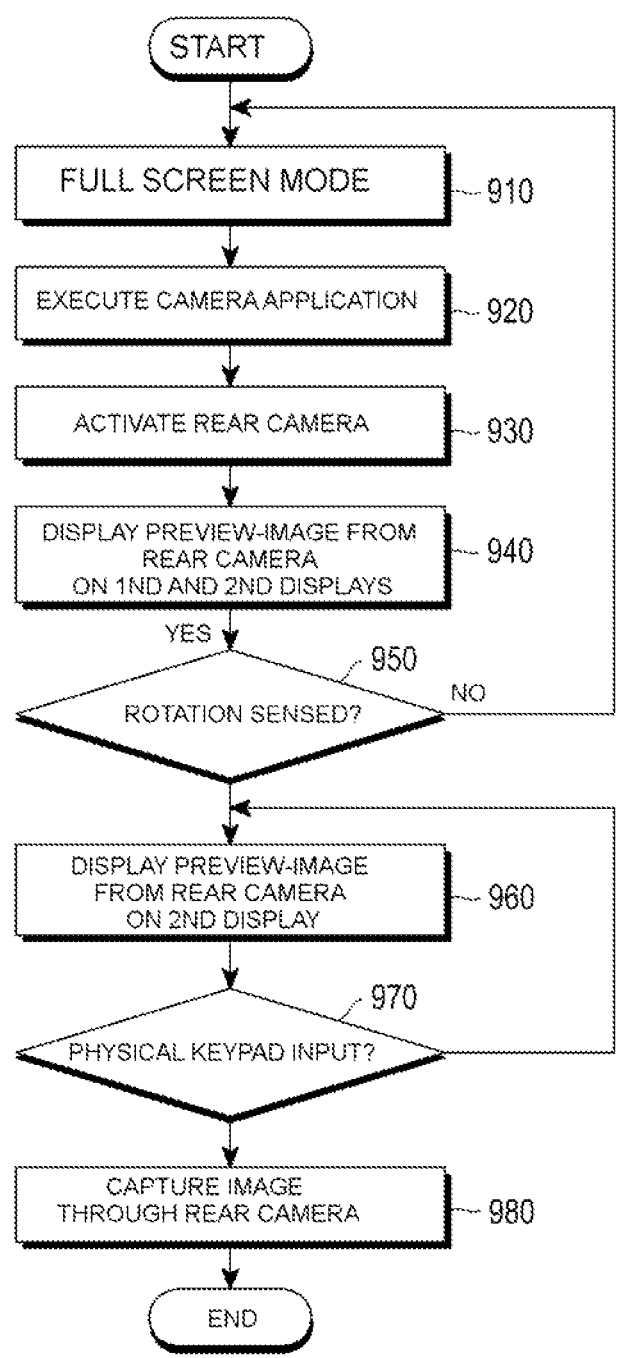
FIG. 9 is a flowchart illustrating an operation of a camera included in an electronic device according to an embodiment of the present invention.
Figure 10:
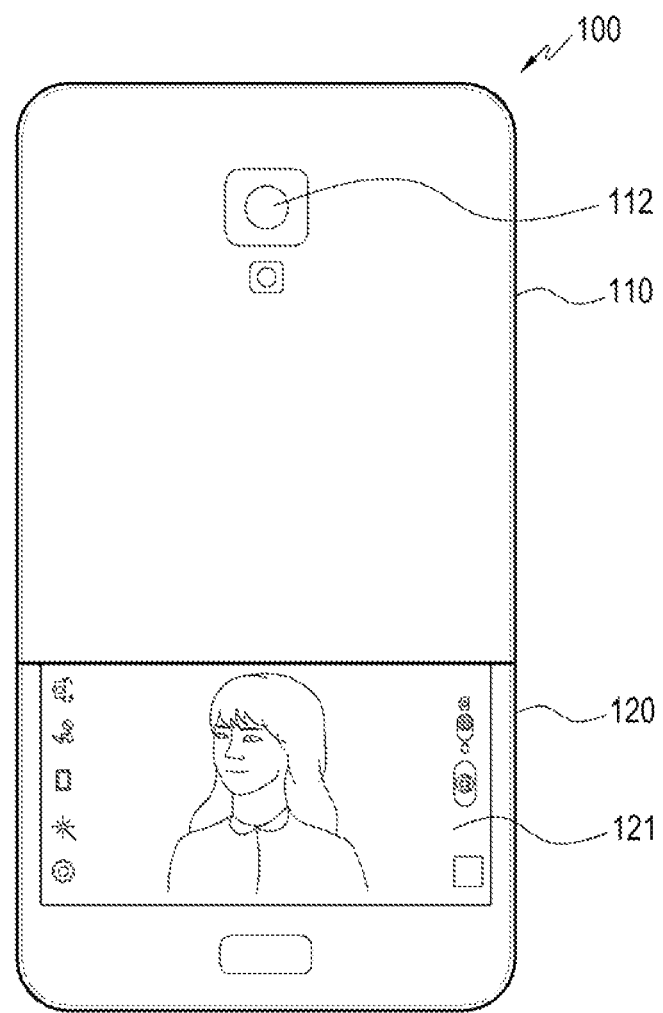
FIG. 10 is a view illustrating an example of image capturing using a rear camera of an electronic device according to an embodiment of the present invention.

FIG. 9 is a flowchart illustrating an operation of a camera included in an electronic device according to an embodiment of the present invention. FIG. 10 is a view illustrating an example of image capturing using a rear camera of an electronic device according to an embodiment of the present invention.

Referring to FIG. 9, the electronic device 100 may operate in a front, full screen mode where the first display 111 and the second display 121 are used as a whole screen as shown in FIG. 1 (step 910). When a camera application is executed in the full screen mode (step 920), a rear camera may be activated to operate (step 930).

According to an embodiment of the present invention, a preview image input through the rear camera may be displayed as a single full image on both the first display 111 and the second display 121 (step 940).

When a rotation of the lower body 120 is sensed and thus the electronic device 100 turns to the position shown in FIG. 10 (step 950), the preview image may be displayed on the second display 121 (step 960).

When an input is provided through the input unit 122 (e.g., a physical keypad) (step 970), image capturing through the rear camera may be performed (step 980).

According to an embodiment of the present invention, at least one of the steps shown in FIG. 9 may be omitted, and at least one more step may be added. Alternatively, at least one step may be performed in a different order from another of the steps.

Referring to FIG. 10, an image input through the rear camera 112 of the electronic device 100, as described above in connection with FIG. 9, may be displayed on the second display 121 of the lower body 120.

The electronic device 100 may include a front camera and a rear camera (e.g., the rear camera 112). The front camera may have a lower resolution than a resolution of the rear camera. For example, the user may use the front camera to take a selfie.

According to an embodiment of the present invention, when the lower body 120 is rotated so that the rear camera 112 and the second display 121 of the lower body 120 are disposed on the same surface (this position may be referred herein as a partial display mode), the user may use the rear camera 112 with a relatively higher resolution to take a selfie.

Figure 11:
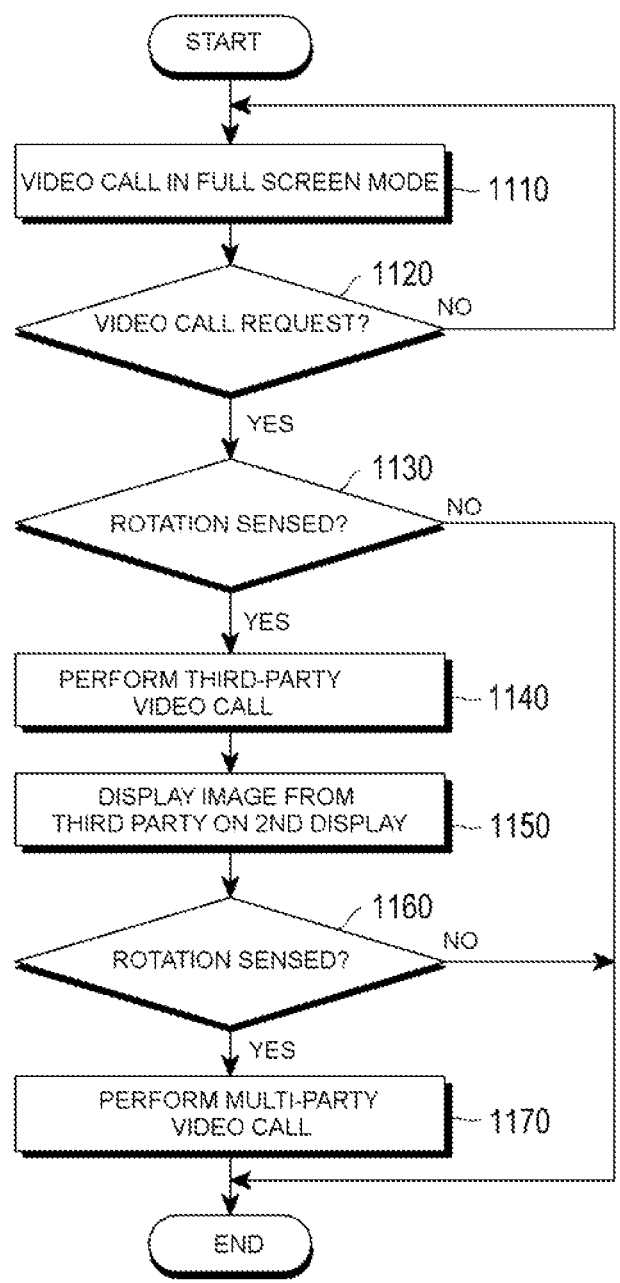
FIG. 11 is a flowchart illustrating a video call procedure according to an embodiment of the present invention.

FIG. 11 is a flowchart illustrating a video call procedure according to an embodiment of the present invention. FIGS. 12, 13, 14, and 15 are views illustrating examples of screen images displayed when a video call is performed according to embodiments of the present invention.

Figure 12:
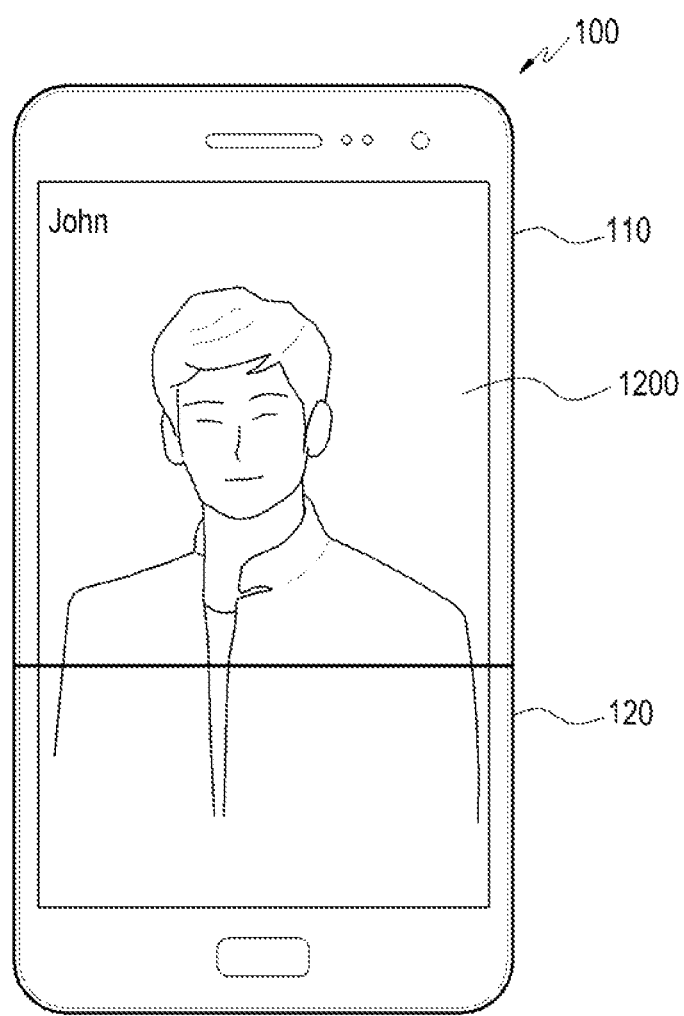
FIGS. 12, 13, 14, and 15 are views illustrating examples of screen images displayed when a video call is performed according to embodiments of the present invention.

Referring to FIG. 11, a video call may be performed in a front, full screen mode as shown in FIG. 12 (step 1110). For example, an image 1200 transmitted from a first opposite party (also referred to as a second user, e.g., 'John') on the line may be displayed in the full screen mode on both the first display 111 of the upper body 110 and the second display 121 of the lower body 120.

Upon reception of a third-party video call request from a second opposite party (also referred to as a third user, e.g., 'Jenny'), the third-party video call request may be displayed on the screen or may be alerted, e.g., by a vibration (step 1120).

When the user of the electronic device 100 rotates the lower body 120, the rotation is sensed (step 1130), and when the rotation is sensed, the third-party video call may be connected and performed (step 1140).

Figure 13:
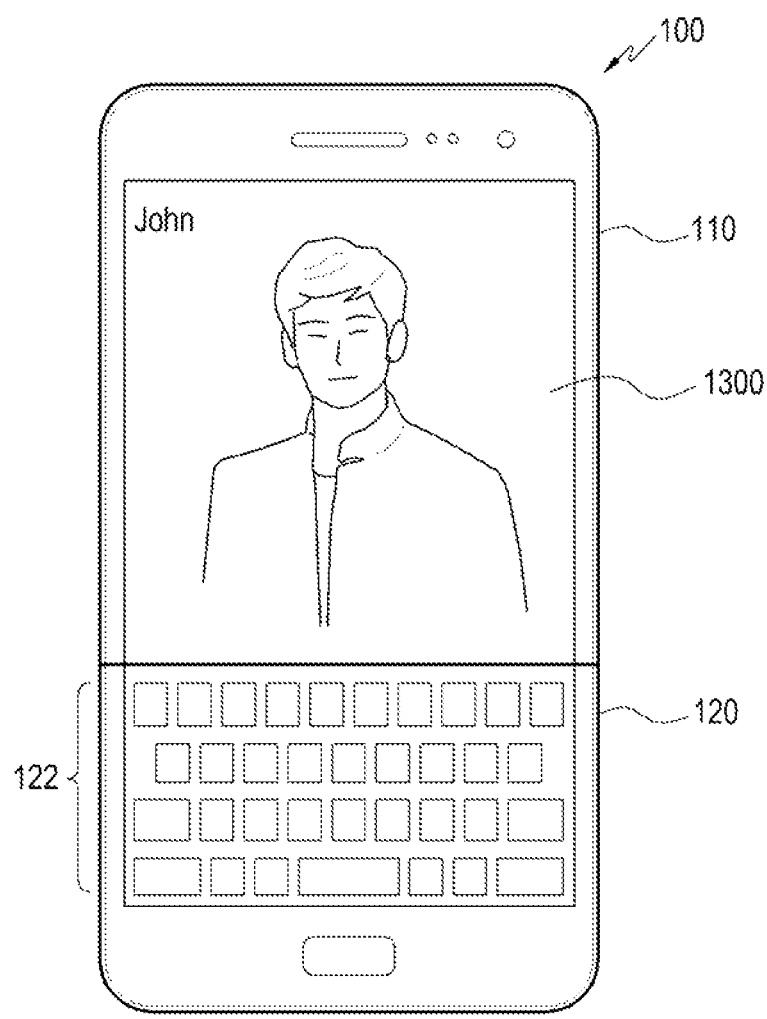
Figure 14:
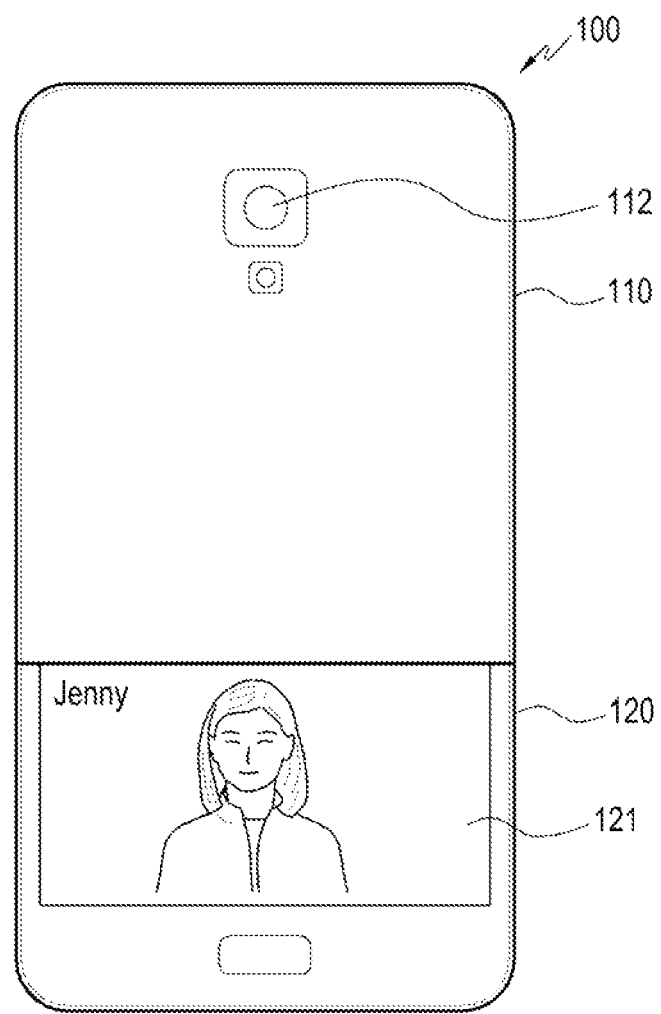
Figure 15:
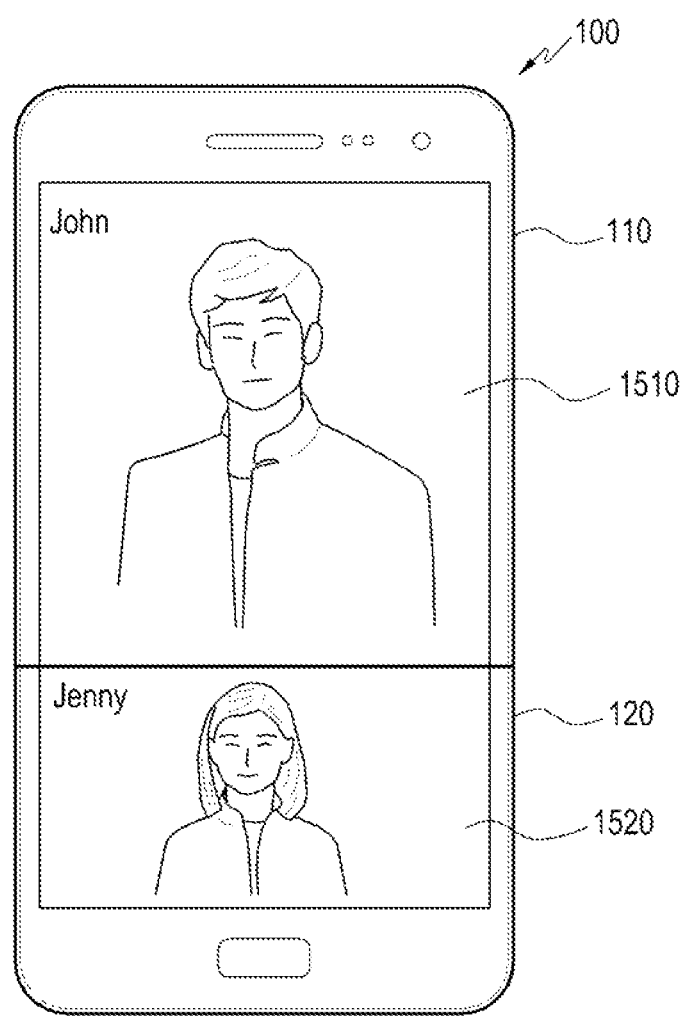

When the lower body 120 is rotated, the front surface of the electronic device 100 may turn to the position shown in FIG. 13, and the rear surface of the electronic device 100 to the position shown in FIG. 14. Referring to FIG. 14, as the third-party video call is connected, an image transmitted from the third user may be displayed on the second display 121 of the lower body 120 of the electronic device 100.

When the user of the electronic device 100 rotates the lower body 120 back, the rotation is sensed (step 1160), and the electronic device 100 may enter a multi-party video call mode, in which the multiple users may perform a video call, (step 1170), and the front screen may be split into two displaying the images sent from the second and third users, respectively.

For example, an image 1510 transmitted from the second user and an image 1520 transmitted from the third user, both, may be displayed on the front surface of the electronic device 100. For example, the image 1510 transmitted from the second user may be displayed on the first display 111 of the upper body 110, and the image 1520 transmitted from the third user may be displayed on the second display 121 of the lower body 120.

According to an embodiment of the present invention, a method for operating an electronic device 100 including an upper body 110 having a first display 111 on a front surface thereof and a lower body 120 having a second display 121 on a front surface. The lower body 120 may be rotatably coupled with the upper body 110. The method may include sensing a rotation of the lower body 120; determining whether at least one input unit 122 provided on a rear surface of the lower body 120 is disposed on the same surface as the first display 111 of the upper body 110, and enabling the at least one input unit 122 depending on the determination.

According to an embodiment of the present invention, the first display 111 and the second display 121 may seamlessly display an image without a cut or gap between the first display 111 and the second display 121, and the first display 111 and the second display 121 may constitute a whole display screen.

According to an embodiment of the present invention, the input unit 122 of the lower body 120 may include a plurality of physical keys.

According to an embodiment of the present invention, the plurality of physical keys, each, may correspond to at least one character, number, or symbol, or a combination thereof.

According to an embodiment of the present invention, the method may further include, when at least two of the physical keys are simultaneously pressed, enabling a predetermined value corresponding to a combination of the two physical keys to be input.

According to an embodiment of the present invention, the method may further include enabling a first camera provided in the rear surface of the upper body 110, sensing the rotation of the lower body 120 to determine whether the first camera of the upper body 110 is disposed on the same surface as the second display 121 of the lower body 120, and displaying an image input through the first camera on the lower body 120.

According to an embodiment of the present invention, the method may further include controlling at least one function of the first camera through at least one of the physical keys of the input unit 122 disposed on the rear surface of the lower body 120.

According to an embodiment of the present invention, the method may further include generating electric power by the rotation of the lower body 120 and recharging a battery of the electronic device with the generated electric power.

According to an embodiment of the present invention, the method may include sensing an angle of rotation of the lower body 120 with respect to the upper body 110 and controlling at least one function of an application executed on the electronic device 100 depending on the sensed angle of rotation.

According to an embodiment of the present invention, the method may include displaying an image received from a first user on the first display 111 and the second display 121, receiving a video call request from a second user, sensing a rotation of the lower body 120 to accept the video call request, and displaying an image received from the second user on the second display 121.

According to an embodiment of the present invention, the method may include sensing a rotation of the lower body 120 to determine whether the first display 111 of the upper body 110 and the second display 121 of the lower body 120 are disposed on the same surface, and performing a multi-party video call with the first user and the second user.

Figure 16:
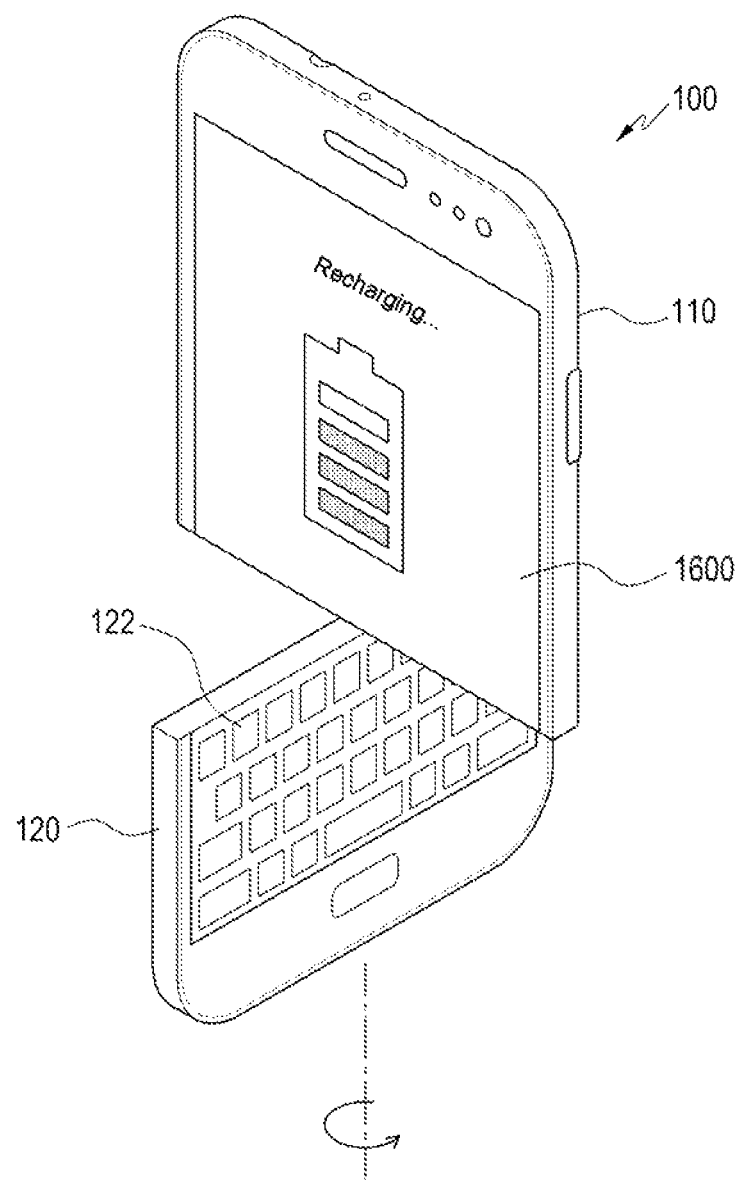
FIG. 16 is a perspective view illustrating an example of recharging a battery of an electronic device by rotating a lower body of the electronic device according to an embodiment of the present invention.

FIG. 16 is a perspective view illustrating an example of recharging a battery of an electronic device by rotating a lower body of the electronic device according to an embodiment of the present invention.

Referring to FIG. 16, as the lower body 120 is rotated with respect to the upper body 110 of the electronic device 100, a rotational force may be created. The electronic device 100 may include a power generator for generating electric power by the rotational force. The battery of the upper body 110 may be recharged by the electric power generated by the power generator.

As the lower body 120 rotates thus recharging the battery, an image or message indicating that the recharging goes on may be displayed on a screen 1600 of the electronic device 100, or an indicator included in the electronic device 100 may flicker to indicate that the battery is being recharged.

Figure 17:
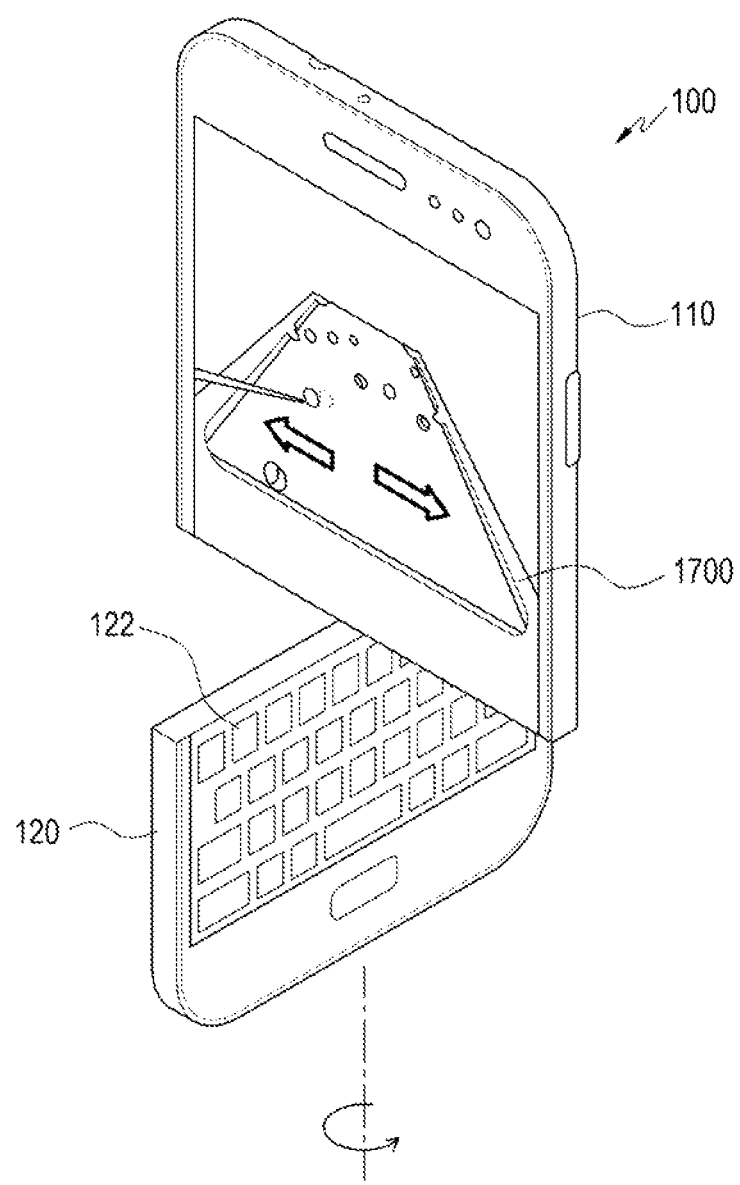
FIG. 17 is a perspective view illustrating an example of controlling an input to an application executed on an electronic device by rotation of a lower body of the electronic device according to an embodiment of the present invention.

FIG. 17 is a perspective view illustrating an example of controlling an input to an application executed on an electronic device by rotation of a lower body of the electronic device according to an embodiment of the present invention.

Referring to FIG. 17, when an application (e.g., a game application) is executed on a screen 1700 of the electronic device 100, as the lower body 120 is rotated with respect to the upper body 110 of the electronic device 100, the rotation may be sensed, and a result of the sensing may be applied to the application being executed.

For example, information sensed by a sensor included in the electronic device 100, including, e.g., whether the lower body 120 is rotated, or a direction or angle of the rotation, may function as an input value to the application. According to an embodiment of the present invention, when a game application is executed on the electronic device 100, directions of the rotation, respectively, may correspond to directions in which an object in the game being performed is moved. For example, the lower body 120 of the electronic device 100 may serve as a wheel for turning the direction of a vehicle or boat in a racing game application being executed on the electronic device 100.

Figure 18:
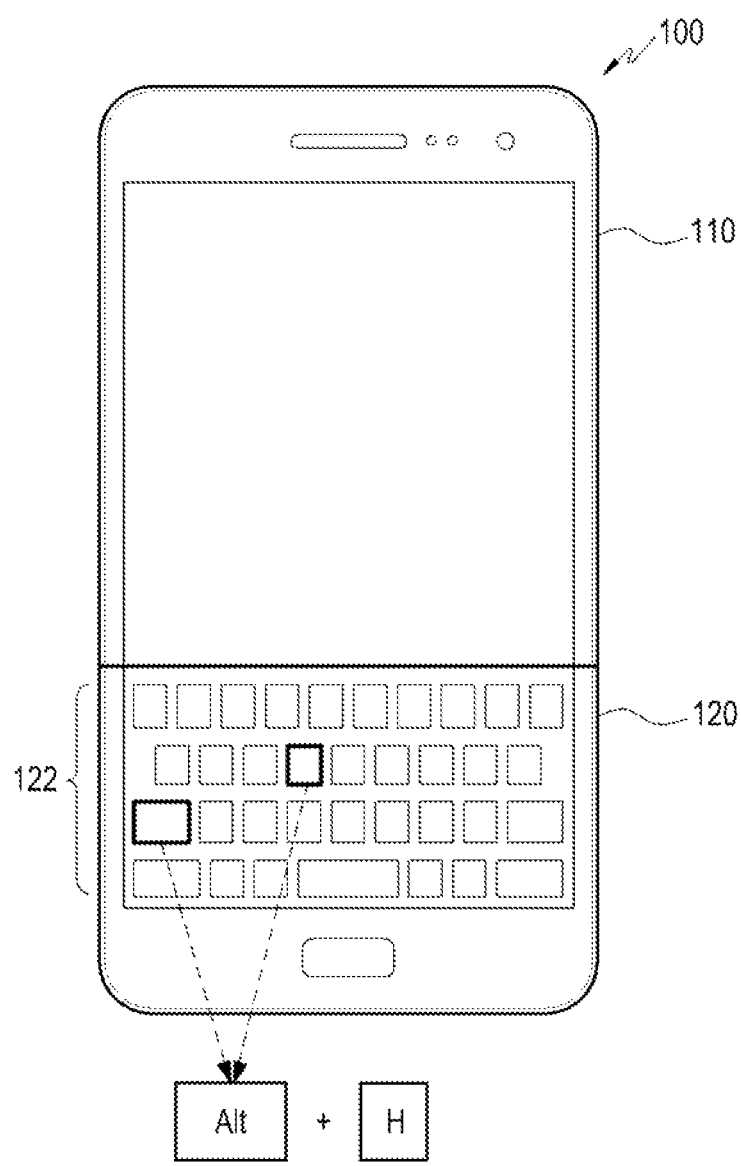
FIG. 18 is a view illustrating an example of simultaneously pressing keys of a physical key input unit provided on a lower body of an electronic device according to an embodiment of the present invention.

FIG. 18 is a view illustrating an example of simultaneously pressing keys of a physical key input unit provided on a lower body of an electronic device according to an embodiment of the present invention.

Referring to FIG. 18, when the lower body 120 of the electronic device 100 is rotated so that the input unit 122 is positioned facing a front of the electronic device 100, e.g., when the electronic device 100 is positioned in the full screen mode, the input unit 122 may be used as an input means for the first display 111. According to an embodiment of the present invention, when the input unit 122 is implemented as a physical keypad including a plurality of keys, the input unit 122 may be configured so that a predetermined value is input to the electronic device 100 by pressing a plurality of keys of the keypad. For example, an 'Alt' key and an 'H' key may be simultaneously pressed to function as a short-key for performing a predetermined function.

Figure 19:
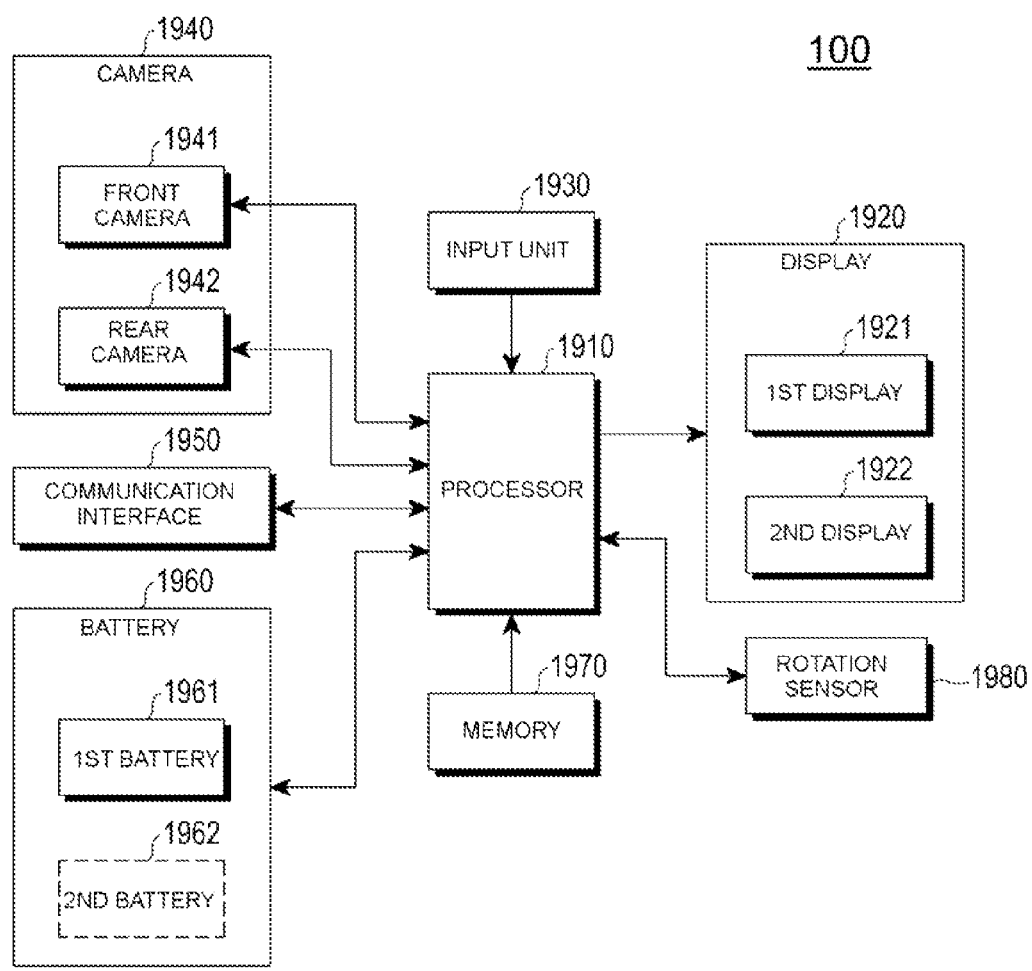
FIG. 19 is a block diagram illustrating a configuration of an electronic device according to an embodiment of the present invention.

FIG. 19 is a block diagram illustrating a configuration of an electronic device according to an embodiment of the present invention.

Referring to FIG. 19, the electronic device may include a processor 1910, displays 1920, an input unit 1930, a camera 1940, a communication interface 1950, a battery 1960, a memory 1970, and a rotation sensor 1980. According to an embodiment of the present invention, at least one of the components of the electronic device may be omitted, or alternatively, at least one more component may be included in the electronic device.

The processor 1910 may include one or more of a central processing unit (CPU), an application processor (AP), and a communication processor (CP). The processor 1910 may control other components of the electronic device or perform an operation or data processing regarding communication on other components of the electronic device.

The controller described above in connection with FIGS. 1 to 18 may be the processor 1910.

The memory 1970 may include a volatile and/or a non-volatile memory. The memory 1970 may store, e.g., a command or data associated with at least one other component of the electronic device. According to an embodiment of the present invention, the memory 1970 may store software and/or a program. The program may include, e.g., a kernel, middleware, an application programming interface (API), and/or an application program (or simply "application"). At least part of the kernel, middleware, and/or API may be at least part of an operating system (OS).

The communication interface 1950 may function as an interface for transferring, e.g., a command or data input from a user or an external device to other component(s) of the electronic device. The communication interface 1950 may output a command or data received from other component(s) of the electronic device to a user or an external device.

The communication interface 1950 may establish communication between the electronic device and an external device. For example, the communication interface 1950 enables the electronic device to access a communication network through wired or wireless communication to enable communication with the external device.

The wireless communication may use at least one communication protocol of, e.g., LTE, LTE-A, CDMA, WCDMA, UMTS, WiBro, or GSM. The wired communication may include at least one, e.g., a universal serial bus (USB), high definition multimedia interface (HDMI), recommended standard (RS)-232, or plain old telephone service (POTS). The communication network may include at least one of, e.g., a computer network (e.g., an LAN or WAN), the Internet, or a telephone network.

Each display 1920 may include, e.g., a liquid crystal display (LCD), an organic light emitting display (OLED), a light emitting device (LED) display, a microelectromechanical system (MEMS) display, or an electronic paper display. Each display 1920 may display, e.g., various contents (e.g., text, images, videos, icons, or symbols) to a user. Each display 1920 include a touchscreen that may receive, e.g., a touch by an electronic pen or part of a user's body, a gesture, a proximity or hovering input.

According to an embodiment of the present invention, the displays 1920 may include a first display 1921 and a second display 1922. The first display 1921 may be the above-described first display 111, and the second display 1922 may be the above-described second display 121. The first display 1921 may be provided in an upper body of the electronic device, and the second display 1922 may be provided in a lower body of the electronic device.

According to an embodiment of the present invention, the input unit 1930 may be the above-described input unit 122. The input unit 1930 may be provided on a rear surface of the lower body of the electronic device, which is opposite a front surface where the second display 1922 is provided.

According to an embodiment of the present invention, two cameras 1940 including a front camera 1941 and a rear camera 1942 may be provided. The rear camera 1942 may be provided on a rear surface of the upper body of the electronic device.

According to an embodiment of the present invention, the battery 1960 may be included in the upper body or lower body of the electronic device. Alternatively, two batteries 1960 may be included in the upper body and lower body, respectively, of the electronic device.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

The rotation sensor 1980 may be the above-described rotation sensor. The rotation sensor 1980 may sense a rotation of the lower body with respect to the upper body. According to an embodiment of the present invention, the rotation sensor 1980 may sense a rotation of the lower body 120, a direction or angle of the rotation.

Information including the rotation, direction or angle of the rotation sensed by the rotation sensor 1980 may apply to a switch between operation modes (e.g., between a full screen mode and a partial screen mode) of the electronic device or an operation of an application being executed on the electronic device.

According to an embodiment of the present invention, the electronic device may further include a power generator that may generate electric power as the lower body rotates. For example, the battery 1960 of the electronic device may be recharged with electric power generated by the power generator as the upper body and the lower body rotate.

According to an embodiment of the present invention, the upper and lower bodies of the electronic device may be rotatably coupled with each other. The lower body of the electronic device may be selectively used as an input means or display.

According to an embodiment of the present invention, the upper body and lower body of the electronic device are rotated with respect to each other, allowing the electronic device various operation modes.

For example, the display provided on the front surface of the lower body may be rotated facing a different way from the display provided on the front surface of the upper body, enabling the high-resolution camera on the rear surface of the electronic device to be used to take selfies.

Upon reception of a video call request from a third party while a video call goes on between the user of the electronic device and an opposite party, rotation of the lower party enables various functions, including, e.g., a multi-party video call.

Electric power generated by rotation of the lower body of the electronic device may be used to recharge the battery of the electronic device.

Angles of rotation of the lower body may be sensed, and the sensed angles of rotation may be used as signals to control various applications that are executed on the electronic device. For example, the sensed angles may be used to turn the direction of an object in a game application.

As will be appreciated by one skilled in the art, aspects of the present inventive concept may be embodied as a system, method or computer program product. Accordingly, aspects of the present inventive concept may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive concept may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive concept may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive concept are described with reference to flowchart illustrations and/or block diagrams of methods, apparatus (systems) and computer program products according to embodiments of the inventive concept. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present inventive concept. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. An electronic device, comprising:
a first body having a first display on a first surface of the first body and a connecting hole formed in a lower part of the first body; and formed in a lower part of the first body; and
a second body having a second display on a first surface of the second body, an input unit on a second surface of the second body, and a connecting protrusion formed in an upper part of the second body, wherein the connecting protrusion is inserted through the connecting hole so that the first body and the second body are rotatably coupled with each other on a longitudinal axis of the connecting protrusion, wherein the input unit of the second body includes at least one physical key, and wherein the second surface of the second body is positioned opposite the first surface of the second body, and wherein the first display and the second display seamlessly abut and adjoin each other with no bezel part positioned there between to configure a whole display screen.

2. The electronic device of claim 1, wherein the at least one physical key corresponds to at least one key value respectively corresponding to at least one character, letter, or symbol.

3. The electronic device of claim 1, further comprising a controller configured to, when an input is performed through at least two of the keys, enable a predetermined value corresponding to a combination of the at least two keys to be input.

4. The electronic device of claim 1, wherein a first camera is provided in a second surface of the first body, and wherein when the second body is rotated with respect to the first body to allow the first camera to be disposed on the same surface as the second display of the second body, an image input through the first camera is displayed on the second display.

5. The electronic device of claim 4, wherein at least one function of the first camera is controlled through the input unit.

6. The electronic device of claim 1, further comprising a battery supplying power to the electronic device, the battery recharged by electric power generated as the second body is rotated.

7. The electronic device of claim 1, further comprising a rotation sensor sensing an angle of rotation of the second body, wherein at least one operation of an application executed on the electronic device is controlled based on the sensed angle of rotation.

8. A method for operating an electronic device, the method comprising:
sensing a rotation of at least one of a first body and a second body included in the electronic device, the first body having a first display on a first surface thereof and a connecting hole formed in a lower part of the first body, and the second body having a second display on a first surface thereof, an input unit on a second surface thereof, which is opposite to the first surface of the second body, and a connecting protrusion formed in an upper part of the second body;
determining whether the input unit is disposed on the same surface as the first display; and
enabling the input unit depending on the determination, wherein the input unit of the second body includes at least one physical key, and
wherein the second surface of the second body is positioned opposite the first surface of the second body, and
wherein the connecting protrusion is inserted through the connecting hole so that the first body and the second body are rotatably coupled with each other on a longitudinal axis of the connecting protrusion, and
wherein the first display and the second display seamlessly abut and adjoin each other with no bezel part positioned there between to configure a whole display screen.

9. The method of claim 8, wherein the at least one physical key corresponds to at least one key value respectively corresponding to at least one character, letter, or symbol.

10. The method of claim 9, further, when an input is performed through at least two of the keys, enabling a predetermined value corresponding to a combination of the at least two keys to be input.

11. The method of claim 8, further comprising:
enabling a first camera provided in a second surface of the first body;
sensing a rotation of the second body to determine whether the first camera is disposed on the same surface as the second display; and
displaying an image input through the first camera o he second display depending on the determination.

12. The method of claim 11, further comprising controlling at least one function of the first camera through the input unit.

13. The method of claim 8, further comprising:
generating electric power as the second body rotates; and
recharging a battery of the electronic device with the generated electric power.

14. The method of claim 8, further comprising:
sensing an angle of rotation of the second body; and controlling at least one operation of an application executed on the electronic device based on the sensed angle of rotation.

15. The method of claim 8, further comprising:

displaying an image received from a first terminal on the first display and the second display as a video call is executed;

receiving a video call request from a second terminal;

sensing a rotation of the second body to accept the video call request; and displaying an image received from the second terminal on the second display.

16. The method of claim 15, further comprising:

sensing the rotation of the second body to determine whether the first display and the second display are disposed on the same surface; and performing a multi-party video call with the first terminal and the second terminal.

\* \* \* \* \*